US010590955B2

(12) United States Patent
Moriyama

(10) Patent No.: US 10,590,955 B2
(45) Date of Patent: Mar. 17, 2020

(54) TURBO-MOLECULAR PUMP

(71) Applicant: Shimadzu Corporation, Kyoto (JP)

(72) Inventor: Nobuhiko Moriyama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 397 days.

(21) Appl. No.: 15/440,061

(22) Filed: Feb. 23, 2017

(65) Prior Publication Data
US 2018/0238334 A1    Aug. 23, 2018

(51) Int. Cl.
| F04D 29/54 | (2006.01) |
| F04D 19/04 | (2006.01) |
| F04D 29/58 | (2006.01) |
| F04D 27/02 | (2006.01) |

(52) U.S. Cl.
CPC ......... F04D 29/542 (2013.01); F04D 19/042 (2013.01); F04D 27/0261 (2013.01); F04D 27/0292 (2013.01); F04D 29/584 (2013.01)

(58) Field of Classification Search
CPC .. F04D 19/042; F04D 27/006; F04D 27/0261; F04D 27/0292; F04D 29/542; F04D 29/584; F04D 29/5853
See application file for complete search history.

(56) References Cited

U.S. PATENT DOCUMENTS

| 5,577,883 | A  | * | 11/1996 | Schutz | F04D 19/04 415/177 |
| 6,123,522 | A  | * | 9/2000 | Kubo | F04D 19/048 417/423.12 |
| 6,599,108 | B2 | * | 7/2003 | Yamashita | F04D 19/04 417/313 |
| 6,644,938 | B2 | * | 11/2003 | Omori | F04D 19/042 415/90 |
| 6,736,593 | B2 | * | 5/2004 | Namiki | F04D 19/048 415/1 |
| 7,090,469 | B2 | * | 8/2006 | Blumenthal | F04D 19/042 417/32 |
| 2011/0044826 | A1 | * | 2/2011 | Kozaki | F04D 19/042 417/63 |

FOREIGN PATENT DOCUMENTS

JP    2011-080407 A    4/2011

OTHER PUBLICATIONS

Office Action in corresponding Chinese Application No. 201510518401.0, dated Jul. 12, 2017 (English translation).

* cited by examiner

Primary Examiner — Patrick Hamo
Assistant Examiner — Joseph S. Herrmann
(74) Attorney, Agent, or Firm — Renner, Otto, Boisselle & Sklar, LLP

(57) ABSTRACT

A turbo-molecular pump comprises a cylindrical rotor to be rotatably driven by a motor; a cylindrical stator provided corresponding to the rotor; a heater configured to elevate a temperature of the stator to a target temperature; a temperature sensor configured to detect the temperature of the stator; and a control section. A rotation start command is input after start of energization of the heater, the control section stops rotary driving of the rotor at a rated rotation speed until the temperature of the stator reaches a predetermined temperature set lower than the target temperature and begins the rotary driving at the rated rotation speed when the temperature of the stator exceeds the predetermined temperature.

8 Claims, 8 Drawing Sheets

RATED ROTATION SPEED
TEMPERATURE = T0

ROTATION SPEED = 0
TEMPERATURE = NORMAL

TURBO-MOLECULAR PUMP

BACKGROUND OF THE INVENTION

1. Technical Field

The present invention relates to a turbo-molecular pump configured to elevate a stator temperature.

2. Background Art

For reducing deposition of a reactive product in a turbo-molecular pump, the technique of elevating the temperature of a stator of the turbo-molecular pump by a heater has been provided (see, e.g., Patent Literature 1 (JP-A-2011-80407)). When the temperature of the stator is elevated, the stator thermally expands to change a gap dimension between a rotor and the stator, and accordingly, exhaust performance changes. Thus, the dimensions of the rotor and the stator are set such that the gap dimension is optimal in an expanded state due to temperature elevation. For this reason, a greater change in expansion upon temperature elevation results in a smaller gap dimension at a normal stator temperature.

The gap dimension at the normal temperature becomes smaller as a temperature set for temperature elevation increases, and therefore, there is a probability that the rotor and the stator contact each other upon start-up of the pump (start of rotation), i.e., when elevation of the temperature of the stator is insufficient. Particularly in the case where the stator temperature upon start-up of the pump is the normal temperature and a rotor temperature is high, the probability of contact increases. For this reason, in the case of using the turbo-molecular pump having a temperature elevation function, there is a problem that a user needs to perform pump start-up operation after completion of temperature elevation, leading to complicated operation. Moreover, in the case of starting up, due to user's erroneous operation, the pump right after start of temperature elevation, there is a disadvantage that the rotor and the stator contact each other.

SUMMARY OF THE INVENTION

A turbo-molecular pump comprises a cylindrical rotor to be rotatably driven by a motor; a cylindrical stator provided corresponding to the rotor; a heater configured to elevate a temperature of the stator to a target temperature; a temperature sensor configured to detect the temperature of the stator; and a control section. A rotation start command is input after start of energization of the heater, the control section stops rotary driving of the rotor at a rated rotation speed until the temperature of the stator reaches a predetermined temperature set lower than the target temperature and begins the rotary driving at the rated rotation speed when the temperature of the stator exceeds the predetermined temperature.

The control section performs, until the predetermined temperature, a first control of stopping the rotor or a second control of rotatably driving the rotor at a predetermined rotation speed lower than the rated rotation speed.

The control section includes a stop determination section configured to determine whether or not the rotor is stopped while the second control is being performed, and an informing section configured to inform an abnormality when the stop determination section determines that the rotor is stopped.

A temperature range of equal to or lower than the predetermined temperature in use of the pump is divided into multiple temperature ranges, and a higher predetermined rotation speed is set for a higher temperature range.

The turbo-molecular pump further comprises: a completion information providing section configured to provide temperature elevation completion information when the temperature of the stator reaches the target temperature.

The turbo-molecular pump further comprises: an estimated time providing section configured to estimate, based on the temperature of the stator detected by the temperature sensor, a temperature elevation time until the stator reaches the target temperature to provide the estimated temperature elevation time.

DETAILED DESCRIPTION OF THE EXEMPLARY EMBODIMENTS

Hereinafter, embodiments of the present invention will be described with reference to the drawings.

First Embodiment

Figure 1:
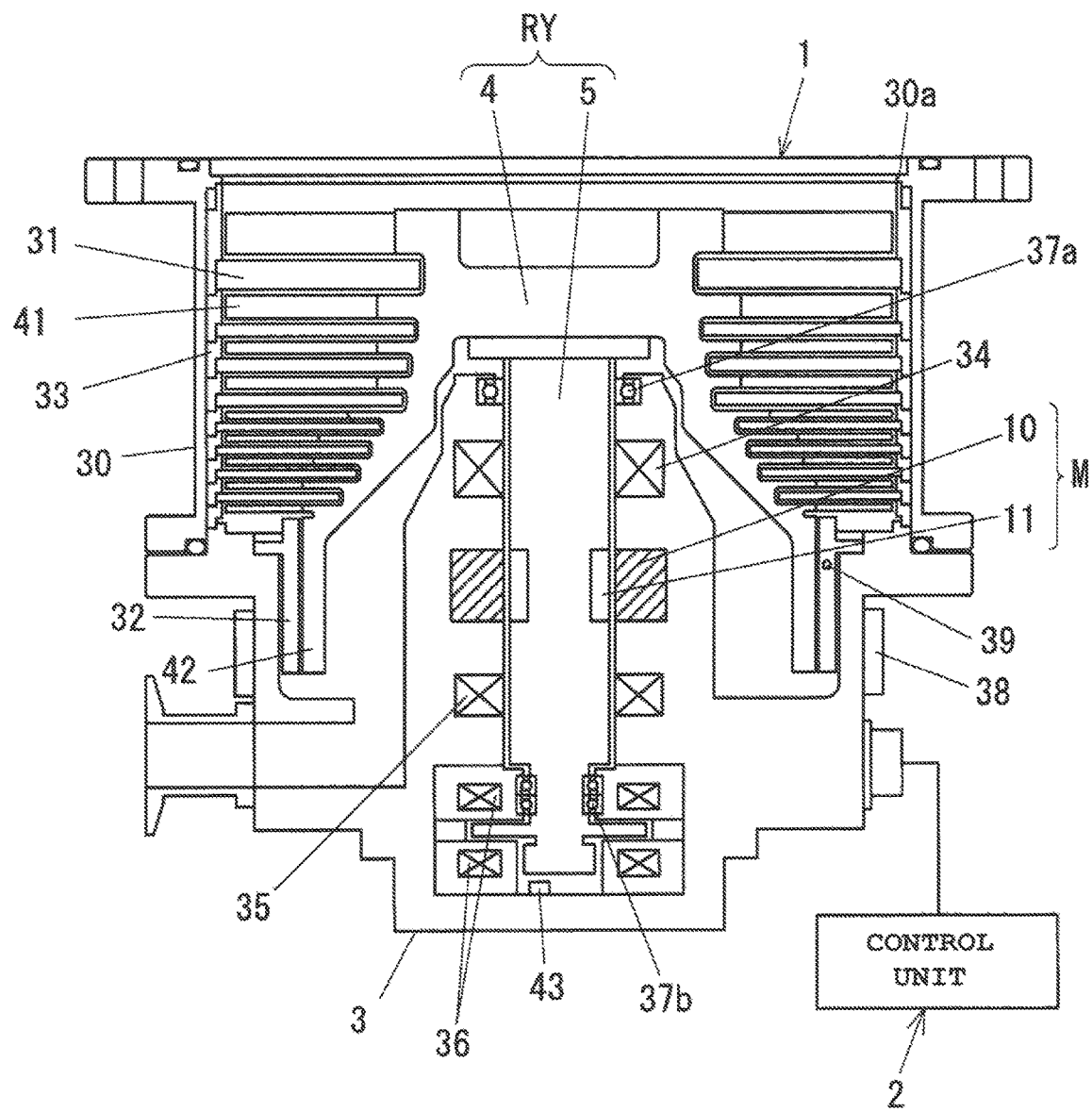
FIG. 1 is a view of a schematic configuration of a turbo-molecular pump.

FIG. 1 is a view of a turbo-molecular pump of the present embodiment. A turbo-molecular pump 100 includes a pump unit 1 configured to perform vacuum exhausting, and a control unit 2 configured to control driving of the pump unit 1.

The pump unit 1 includes a turbo pump stage having rotor blades 41 and stationary blades 31, and a drag pump stage (a screw groove pump stage) having a cylindrical portion 42 and a stator 32. In the screw groove pump stage, a screw groove is formed at the stator 32 or the cylindrical portion 42. The rotor blades 41 and the cylindrical portion 42 as rotary side exhaust functions are formed at a pump rotor 4. The pump rotor 4 is fastened to a shaft 5. The pump rotor 4 and the shaft 5 form a rotor unit RY.

The stationary blades 31 and the rotor blades 41 are alternately arranged in an axial direction. Each stationary blade 31 is placed on a base 3 with spacer rings 33 being interposed therebetween. When a pump casing 30 is bolted to the base 3, the stack of the spacer rings 33 is sandwiched between the base 3 and a lock portion 30a of the pump casing 30, and in this manner, the stationary blades 31 are positioned.

The turbo-molecular pump 100 illustrated in FIG. 1 is a magnetic levitation turbo-molecular pump, and the shaft 5 is non-contact supported by magnetic bearings 34, 35, 36 provided at the base 3. Although not specifically shown in the figure, each of the magnetic bearings 34 to 36 includes electromagnets and a displacement sensor. The displacement sensor is configured to detect a levitation position of the shaft 5. The rotation speed (the rotation speed per second) of the shaft 5, i.e., the pump rotor 4, is detected by a rotation sensor 43.

The shaft 5 is rotatably driven by a motor M. When the magnetic bearings are not in operation, the shaft 5 is supported by emergency mechanical bearings 37a, 37b. A heater 38 configured to elevate the temperature of the stator 32 is provided at the outer periphery of the base 3. The temperature of the stator 32 is detected by a temperature sensor 39, and a detection result of the temperature sensor 39 is input to the control unit 2.

Figure 2:
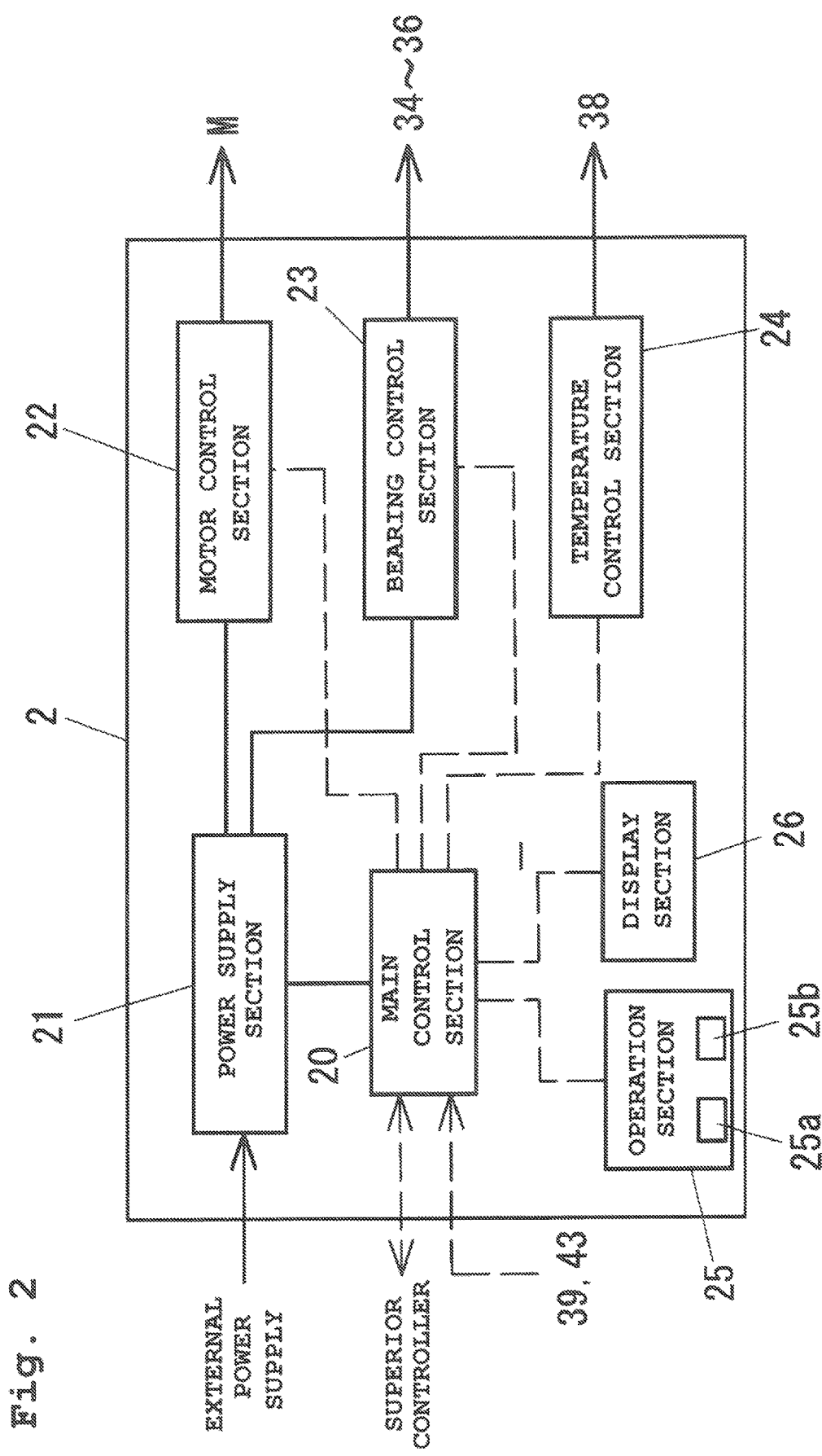
FIG. 2 is a block diagram of a schematic configuration of a control unit.

FIG. 2 is a block diagram of a schematic configuration of the control unit 2. The control unit 2 includes a main control section 20, a power supply section 21, a motor control section 22, a bearing control section 23, a temperature control section 24, an operation section 25, and a display section 26.

AC power is supplied from an external power supply to the power supply section 21. The power supply section 21 is configured to convert the supplied AC power into DC power to supply the DC power to the main control section 20, the motor control section 22, the bearing control section 23, etc. The motor control section 22 is configured to supply drive power to a motor stator 10 of the pump unit 1 to control rotation of the motor M. The bearing control section 23 is configured to supply excitation current to the electromagnets of the magnetic bearings 34 to 36 based on displacement signals from the displacement sensors provided respectively at the magnetic bearings 34 to 36, thereby magnetically levitating the shaft 5 to a desired position. The temperature control section 24 is configured to control energization/non-energization of the heater 38 based on a temperature detection signal from the temperature sensor 39, thereby controlling the stator 32 to a desired target temperature T0. Note that the temperature detection signal from the temperature sensor 39 is input to the main control section 20, and the temperature control section 24 performs energization control in response to temperature information received form the main control section 20.

The operation section 25 is configured to perform input operation for the control unit 2, and is provided with a power supply switch 25a and a start switch 25b. When the power supply switch 25a is turned ON, the power supply section 21 is powered on to supply power to the bearing control section 23, the temperature control section 24, etc. Then, magnetic levitation by the magnetic bearings 34 to 36 begins. When the start switch 25b is turned ON, motor drive control by the motor control section 22 begins. The state of the pump unit 1 such as a rotor rotation speed, an operation state (e.g., acceleration and rotation at a rated speed), and a stator temperature is displayed on the display section 26.

The main control section 20 is configured to control the entirety of the control unit 2, and later-described start-up control is also executed by the main control section 20. The temperature detection signal from the temperature sensor 39 and a rotation detection signal from the rotation sensor 43 are input to the main control section 20. Moreover, a command from a superior controller (e.g., a controller of a vacuum device equipped with the pump unit 1) is input as a remote signal to the main control section 20. Further, the main control section 20 can output pump information to the superior controller.

As described above, when gas causing a deposition substance is exhausted, the deposition substance tends to be generated on the stator 32 and the cylindrical portion 42 on an exhaust downstream side. For this reason, for reducing generation of the deposition substance, the temperature of the stator 32 is elevated by the heater 38 in the turbo-molecular pump of the present embodiment. Although the target temperature T0 for temperature elevation varies according to the type of gas to be exhausted, the stator temperature might be, for a deposition substance having a high sublimation temperature, elevated to about a hundred and several tens of degrees.

When the stator temperature increases, the stator 32 thermally expands, leading to a large gap dimension between the stator 32 and the cylindrical portion 42. Such a gap dimension is set to an optimal gap dimension when the temperature of the stator 32 is elevated by the heater 38 and is maintained at the predetermined target temperature T0. Thus, when the stator temperature is lower than the target temperature T0, the gap dimension is smaller than the optimal gap dimension, and therefore, there is a probability that the cylindrical portion 42 and the stator 32 contact each other. In particular, such contact tends to occur when the stator 32 is at a normal temperature and the cylindrical portion 42 thermally expands toward an outer peripheral side due to an increase in a rotor temperature.

Figure 3A:
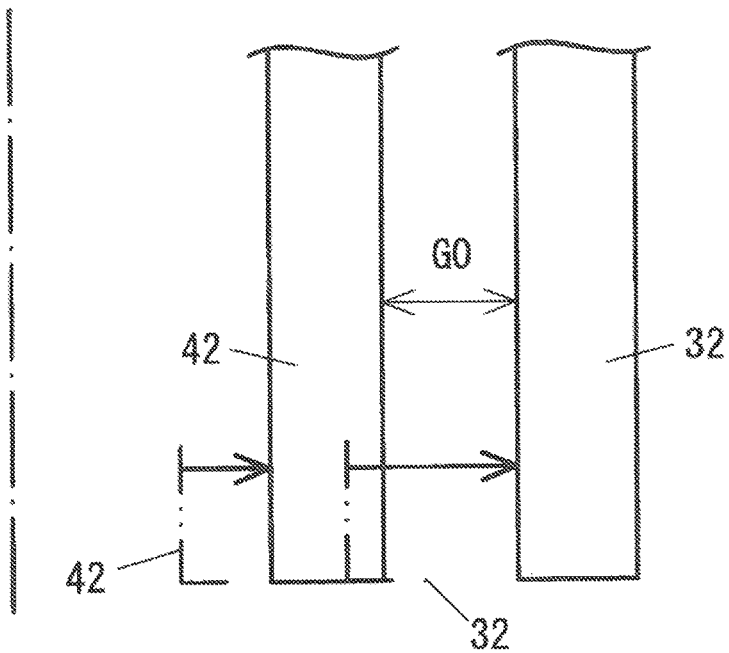
FIGS. 3A and 3B are schematic views for describing a gap dimension.
Figure 3B:
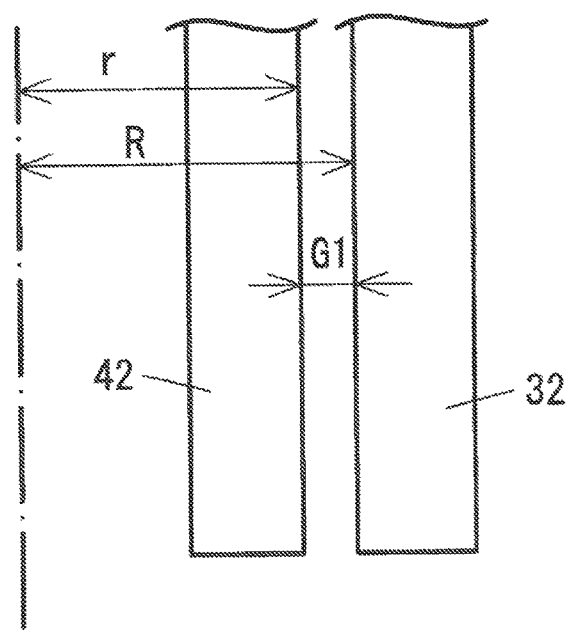

FIGS. 3A and 3B are schematic views for describing the gap dimension between the cylindrical portion 42 and the stator 32. FIG. 3A illustrates a situation in use of the pump when the rotor rotation speed is the rated rotation speed and the temperature of the stator 32 is the target temperature T0. The rated rotation speed is a rotation speed provided according to pump specifications, and generally, control is made such that the rotor rotation speed reaches the rated rotation speed regardless of the magnitude of gas load. Note that the temperature of the cylindrical portion 42 also increases in use of the pump. However, in this example, the temperature of the cylindrical portion 42 is taken as a normal temperature. FIG. 3B illustrates a situation when the pump is stopped, i.e., when the rotor rotation speed is zero and the temperature of the stator 32 is the normal temperature (e.g., 20° C.). A character "r" represents the outer peripheral radius of the cylindrical portion 42, and a character "R" represents the inner peripheral radius of the stator 32.

In the pump use state illustrated in FIG. 3A, the stator 32 deforms outward (toward the right side as viewed in the figure) in a radial direction due to thermal expansion, and the cylindrical portion 42 deforms outward in the radial direction due to centrifugal force. At this point, the gap dimension between the stator 32 and the cylindrical portion 42 is designed to be the optimal gap dimension G0. On the other hand, in the pump stop state of FIG. 3B, deformation of the cylindrical portion 42 due to centrifugal force and thermal expansion of the stator 32 due to temperature elevation are not caused, and therefore, the gap dimension between the stator 32 and the cylindrical portion 42 is G1 (<G0). In the case of a high target temperature T0 for temperature elevation, G1<G0 is satisfied as illustrated in FIGS. 3A and 3B. Thus, when the pump rotor 4 rotates from the state illustrated in FIG. 3B without elevating the temperature of the stator 32, the cylindrical portion 42 deforms due to centrifugal force, and accordingly, the gap dimension decreases. Thus, there is a probability that the cylindrical portion 42 contacts the stator 32.

Figure 4:
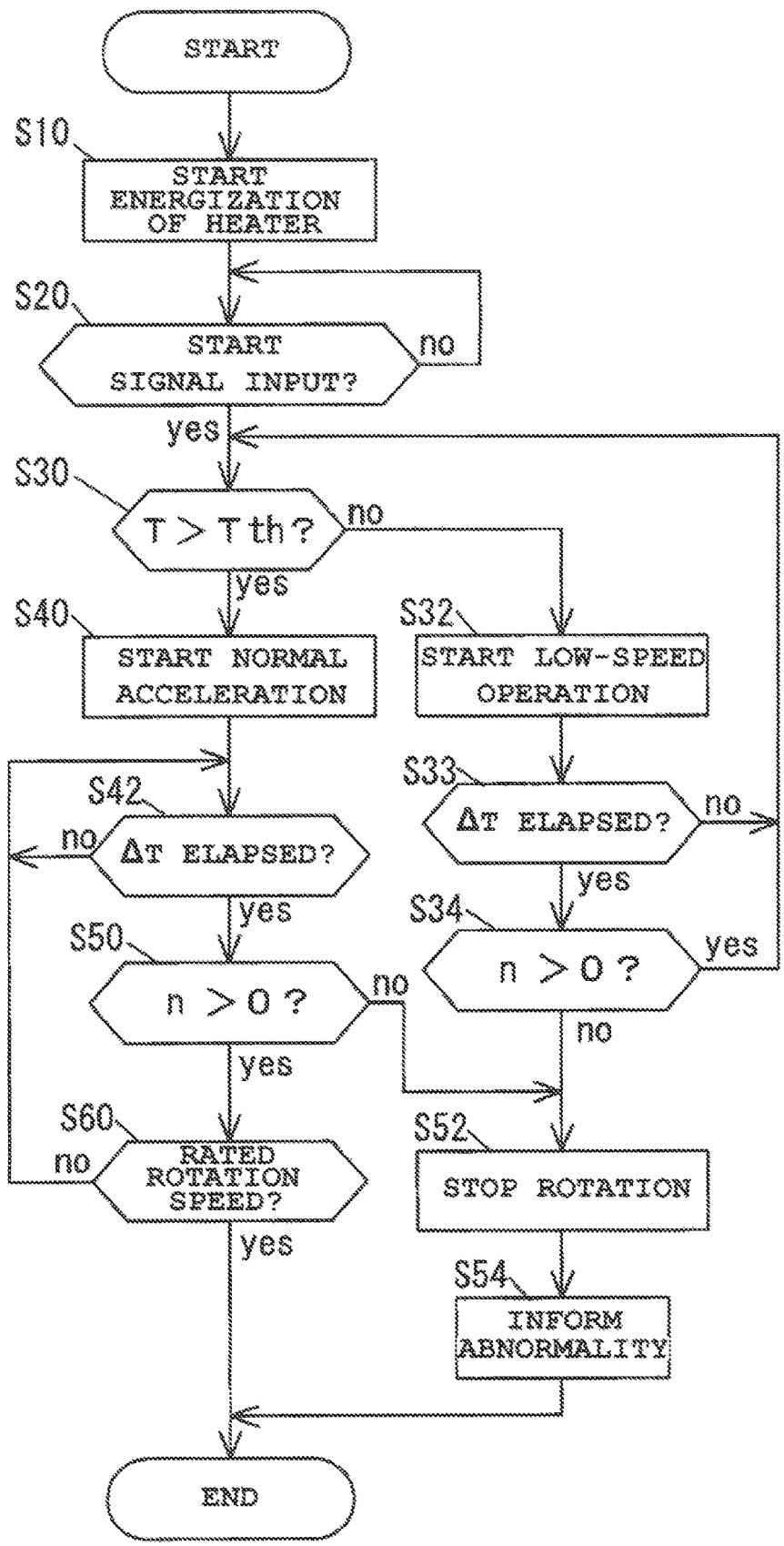
FIG. 4 is a flowchart for describing start-up control.

For preventing the above-described contact, the start-up control as shown in FIG. 4 is, in the present embodiment, performed in response to the operation of turning ON the start switch 25b or input of a start signal. A flowchart of FIG. 4 shows processing until the rotor rotation speed reaches the rated rotation speed after the start switch 25b has been turned ON after power-on. Upon power-on by the operation of turning ON the power supply switch 25a, the main control section 20 executes the control shown in FIG. 4.

At a step S10, the temperature control section 24 starts energization of the heater 38. At a step S20, it is determined whether or not the start signal is input to the main control section 20. The start signal is input to the main control section 20 by the operation of turning ON the start switch 25b or remote operation. At the step S20, when it is determined as confirming input of the start signal (YES), the processing proceeds to a step S30. At the step S30, it is, based on the detection signal of the temperature sensor 39, determined whether or not the temperature T of the stator 32 exceeds a predetermined temperature Tth. The predetermined temperature Tth will be described later in detail.

At the step S30, when it is determined that the temperature T of the stator 32 exceeds the predetermined temperature Tth, the processing proceeds to a step S40, thereby causing the motor control section 22 to perform the normal acceleration operation for the rated rotation speed as a target rotation speed. At a step S42, it is determined whether or not a predetermined time Δt has been elapsed after start of acceleration. At the step S42, when it is determined that the predetermined time Δt has been elapsed, the processing proceeds to a step S50. At the step S50, it is determined whether or not the rotor rotation speed n satisfies n>0, i.e., the pump rotor 4 begins rotating. The predetermined time Δt in this case may be about two minutes. This allows determination on whether or not the pump rotor 4 adheres to the stator 32 due to generation of the deposition substance. When adherence is confirmed, n=0 is satisfied, and therefore, it is determined as "no" at the step S50. Then, the processing proceeds to a step S52 to stop rotation of the pump rotor 4. At a subsequent step S54, the abnormality informing processing of informing that rotation does not begin is performed. Examples of the method for the abnormality informing processing include display of an error on the display section 26 of FIG. 2, and output of an abnormality signal to the superior controller.

At a step S60, it is determined whether or not the rotation speed of the pump rotor 4 reaches the rated rotation speed as the target rotation speed. At the step S60, when it is determined as having reached the rated rotation speed, a series of start-up processing ends. On the other hand, when the rotation speed of the pump rotor 4 does not reach the rated rotation speed, the processing returns to the step S42.

On the other hand, when it is, at the step S30, determined that the stator temperature T is equal to or lower than the predetermined temperature Tth, the processing proceeds to a step S32, thereby causing the motor control section 22 to perform the low-speed operation (including a rotation stop state with a rotation speed of zero) of performing rotation at a low rotation speed much lower than the rated rotation speed. The low rotation speed is set to such a rotation speed that the cylindrical portion 42 does not contact the stator 32 even when the stator temperature T is the normal temperature (e.g., 20° C.) and the pump rotor 4 deforms due to thermal expansion and centrifugal force. For example, the low rotation speed is set to about 10% (several tens of rps) of the rated rotation speed, considering allowance for contact.

At steps S33, S34, processing similar to that of the steps S42, S50 described above is performed. At the step S33, when it is determined that the predetermined time Δt has not been elapsed, the processing returns to the step S30. When it is determined that the predetermined time Δt has been elapsed, the processing proceeds to the step S34. Then, at the step S34, when it is determined that the rotor rotation speed n satisfies n>0, the processing returns to the step S30. When it is determined as satisfying n=0, the processing proceeds to the step S52. As described above, rotary driving at the low rotation speed is maintained until the temperature of the stator 32 exceeds the predetermined temperature Tth. Meanwhile, it is, at the steps S33, S34, determined whether or not the pump rotor 4 adheres to the stator 32. Then, when T>Tth is satisfied, the processing proceeds from the step S30 to the step S40, and the operation for acceleration to the rated rotation speed automatically begins.

(Description of Predetermined Temperature Tth)

Figure 5A:
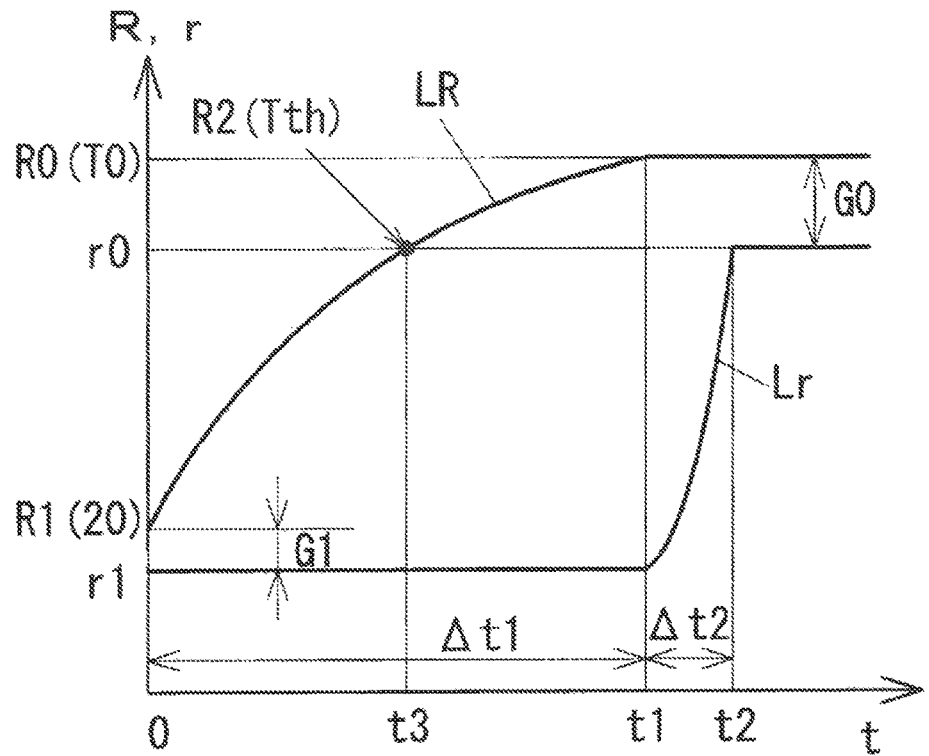
FIGS. 5A and 5B are graphs for describing a predetermined temperature.
Figure 5B:
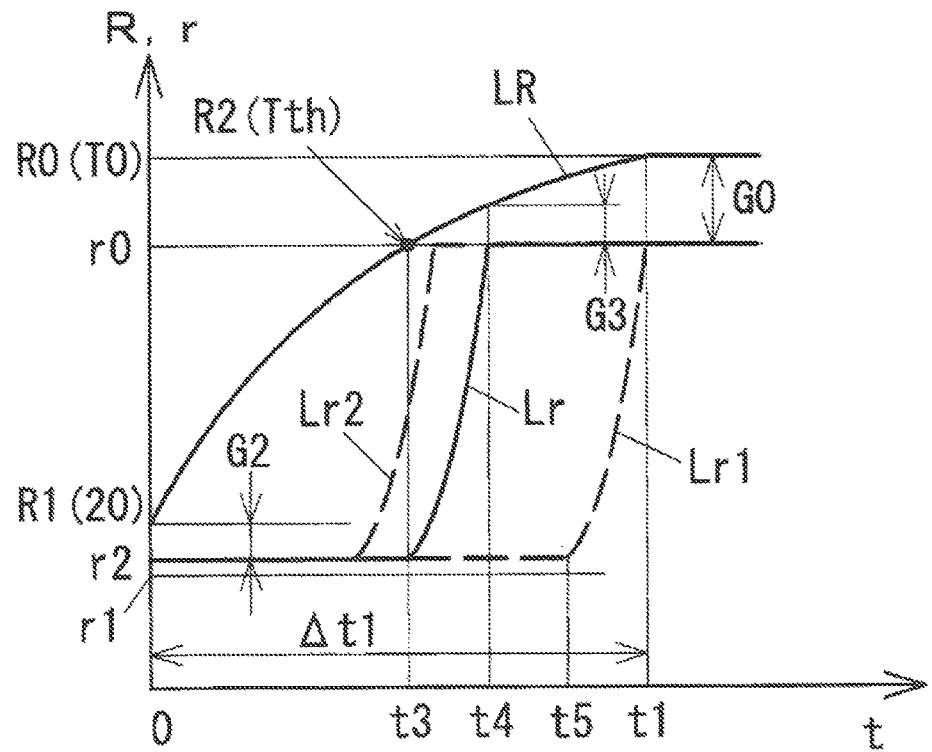

FIGS. 5A and 5B are graphs for describing the above-described predetermined temperature Tth. FIG. 5A is a graph of a temporal change in deformation of the stator 32 due to thermal expansion and deformation of the cylindrical portion 42 due to centrifugal force after pump start-up. A curved line LR indicates the inner peripheral radius R (see FIG. 3B) of the stator 32. Temperature elevation begins at a time point t of 0 (the stator temperature is 20° C.), and the stator temperature reaches the target temperature T0 at a time point t1. After the time point t1, the stator temperature is maintained at the target temperature T0. On the other hand, a curved line Lr indicates the outer peripheral radius r (see FIG. 3B) of the cylindrical portion 42. Rotor rotation begins at the time point t1, and the rotor rotation speed reaches the rated rotation speed at a time point t2.

The inner peripheral radius R of the stator 32 is R1 (20) at a time point t of 0 (a stator temperature of 20° C.), and increases to R0 (T0) at the time point t1 (a stator temperature of T0). The outer peripheral radius r of the cylindrical portion 42 is r1 upon start of rotation (t=t1), and increases to r0 when the rotor rotation speed reaches the rated rotation speed (the time point t2). A gap dimension G1 (see FIG. 3B) at a time point t of 0 is obtained by G1=R1 (20)−r1, and the optimal gap dimension G0 at the time point t2 is obtained by G0=R0 (T0)−r0. In the case of FIG. 5A, a time required until a pump usable state (the rated rotation speed and a stator temperature of T0) after start of temperature elevation is a time obtained by adding an acceleration time Δt2 to a temperature elevation time Δt1. Although the temperature elevation time Δt1 varies according to the set elevated temperature (the target temperature T0) of the stator 32, the capacity (an exhaust speed) of a pump type, and an environmental temperature, the temperature elevation time Δt1 is normally about several tens of minutes to one hour.

In the present embodiment, the low speed operation of performing rotation at the low rotation speed (several tens of rps) much lower than the rated rotation speed is performed when the stator temperature T is equal to or lower than the predetermined temperature Tth, and the operation for acceleration to the rated rotation speed is performed when T>Tth is satisfied, as described with reference to FIG. 4. Note that the predetermined temperature Tth may be set to, e.g., Target Temperature T0−10° C. The outer peripheral radius r of the cylindrical portion 42 at the low rotation speed is r2, and G2 (=R1 (20)−r2) is a gap dimension upon start of rotation. The above-described low rotation speed is set such that the gap dimension G2 is equal to or greater than an acceptable value with which contact between the stator 32 and the cylindrical portion 42 can be prevented.

In the example shown in FIG. 5B, the stator temperature when a time t3 has been elapsed after start of temperature elevation is taken as the predetermined temperature Tth. When acceleration begins at a time point t3, the rotor rotation speed reaches the rated rotation speed at a time point t4, and the outer peripheral radius r of the cylindrical portion 42 at this point is r0. Then, the time point t3, i.e., the predetermined temperature Tth, is set such that the gap dimension G3 at the time point t4 is equal to or larger than the gap dimension G2 at a time point t of 0.

A curved line Lr2 indicated by a dashed line indicates the case where the acceleration operation begins at a time point earlier than the time point t3. In this case, a gap dimension when the rotor rotation speed reaches the rated rotation speed is smaller than G3, and the cylindrical portion 42 might contact the stator 32 due to rotor vibration such as disturbance. Moreover, a curved line Lr1 indicated by a dashed line indicates the case where acceleration of rotor rotation begins at a time point t5 such that the rotor rotation speed reaches the rated rotation speed at the time point t1 at which the stator temperature reaches the target temperature T0. That is, t4−t3=t1−t5 is satisfied.

A time point at which the low speed operation transitions to the acceleration operation is set between the time point t3 and the time point t5. In this manner, the turbo-molecular pump is brought into a main exhaust state right after the temperature elevation time Δt1 has been elapsed, and processing and operation of the vacuum device can be started. As compared to the case where the acceleration operation begins after the stator temperature has reached the target temperature T0 as shown in FIG. 5A, a pump start-up time can be shortened by the acceleration time Δt2. Needless to say, when a temperature at the time point t4 of FIG. 5B is T(t4), the predetermined temperature Tth may be set to T(t4)<Tth≤T0. In this case, a time until a processable state is longer than the temperature elevation time Δt1.

As described above, in the present embodiment, when the start switch 25b is operated, driving at the low rotation speed is performed until the stator temperature exceeds the predetermined temperature Tth, i.e., until the stator temperature reaches, even after start of acceleration, such a temperature that contact between the cylindrical portion 42 and the stator 32 can be prevented. When the stator temperature exceeds the predetermined temperature Tth, the operation for acceleration to the rated rotation speed automatically begins. Thus, an operator does not need to perform the burdensome operation of turning ON the start switch 25b after the predetermined temperature elevation time has elapsed. Moreover, even at any timing of operating the start switch 25b after power-on, contact between the cylindrical portion 42 and the stator 32 can be prevented.

(Variation)

In a variation, it is configured such that temperature elevation information indicating the status of the stator temperature is provided. Specifically, a temperature or an estimated temperature elevation completion time is displayed on the display section 26, or an indication of temperature elevation completion is displayed on the display section 26. Moreover, these types of information (temperature information, estimated time information, and completion information) may be output to the outside. With the temperature elevation information, an abnormality can be detected based on the temperature elevation information when such an abnormality is caused in a temperature elevation system. Moreover, since the estimated temperature elevation completion time is provided, preparation for subsequent operation can be performed at proper timing.

Figure 6:
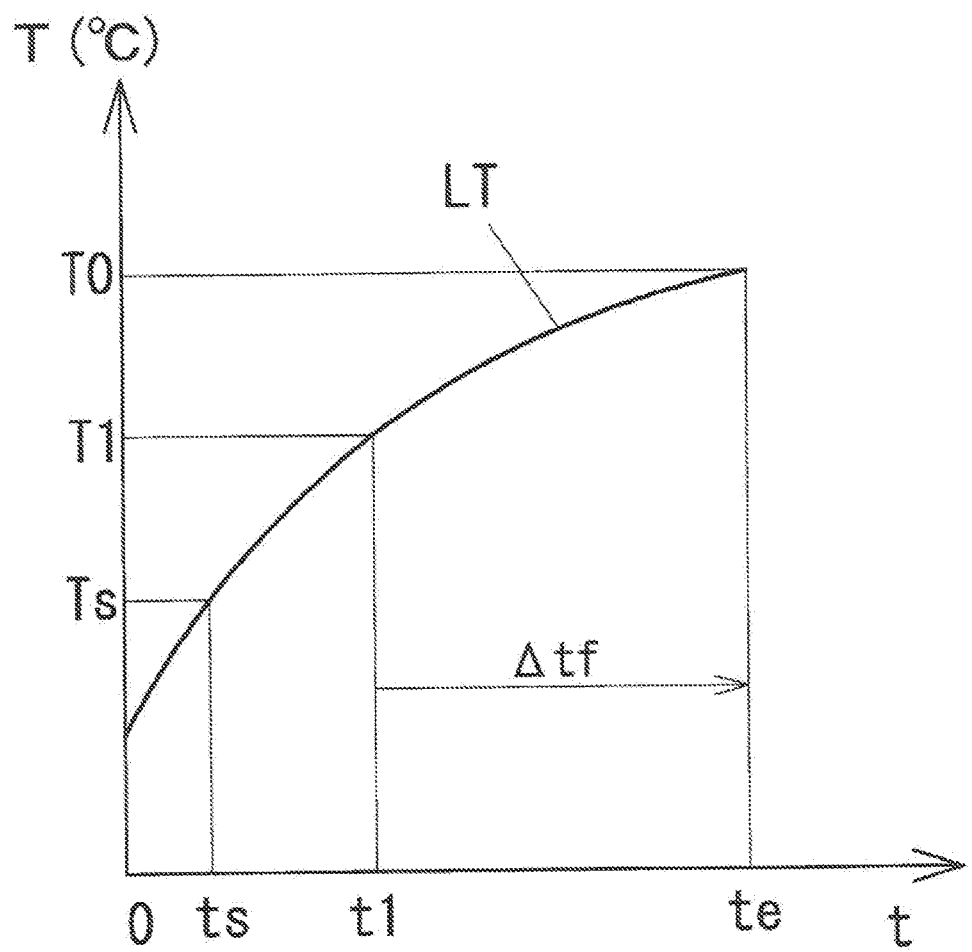
FIG. 6 is a graph for describing a correlation LT.

The temperature is displayed based on an output signal of the temperature sensor 39, and a temperature elevation completion signal is displayed on the display section 26 when a detection temperature reaches the target temperature T0. Moreover, the estimated temperature elevation completion time is estimated using a pre-obtained correlation LT between the stator temperature and the time in temperature elevation as shown in FIG. 6. In FIG. 6, the vertical axis indicates the temperature (° C.), and the horizontal axis indicates the time. Moreover, "ts" is a heater energization start time, "Ts" is the stator temperature upon start of energization, and a time point te is a time point at which the stator temperature reaches the target temperature T0. When a current (the time point t1) stator temperature detected by the temperature sensor 39 is T1, the estimated temperature elevation completion time Δtf satisfies Δtf=te−t1.

Second Embodiment

Figure 7:
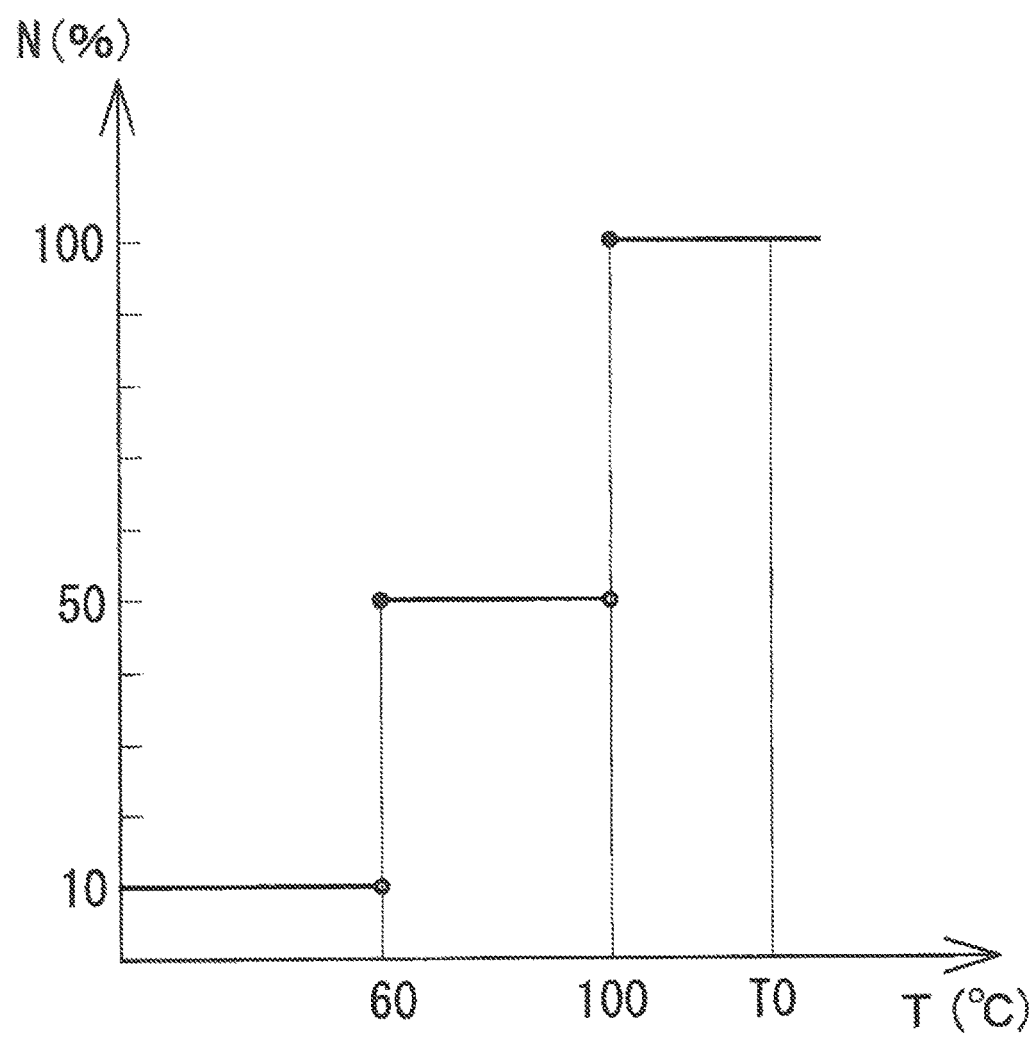
FIG. 7 is a graph of an example of a relationship between a stator temperature and a rotor rotation speed.
Figure 8:
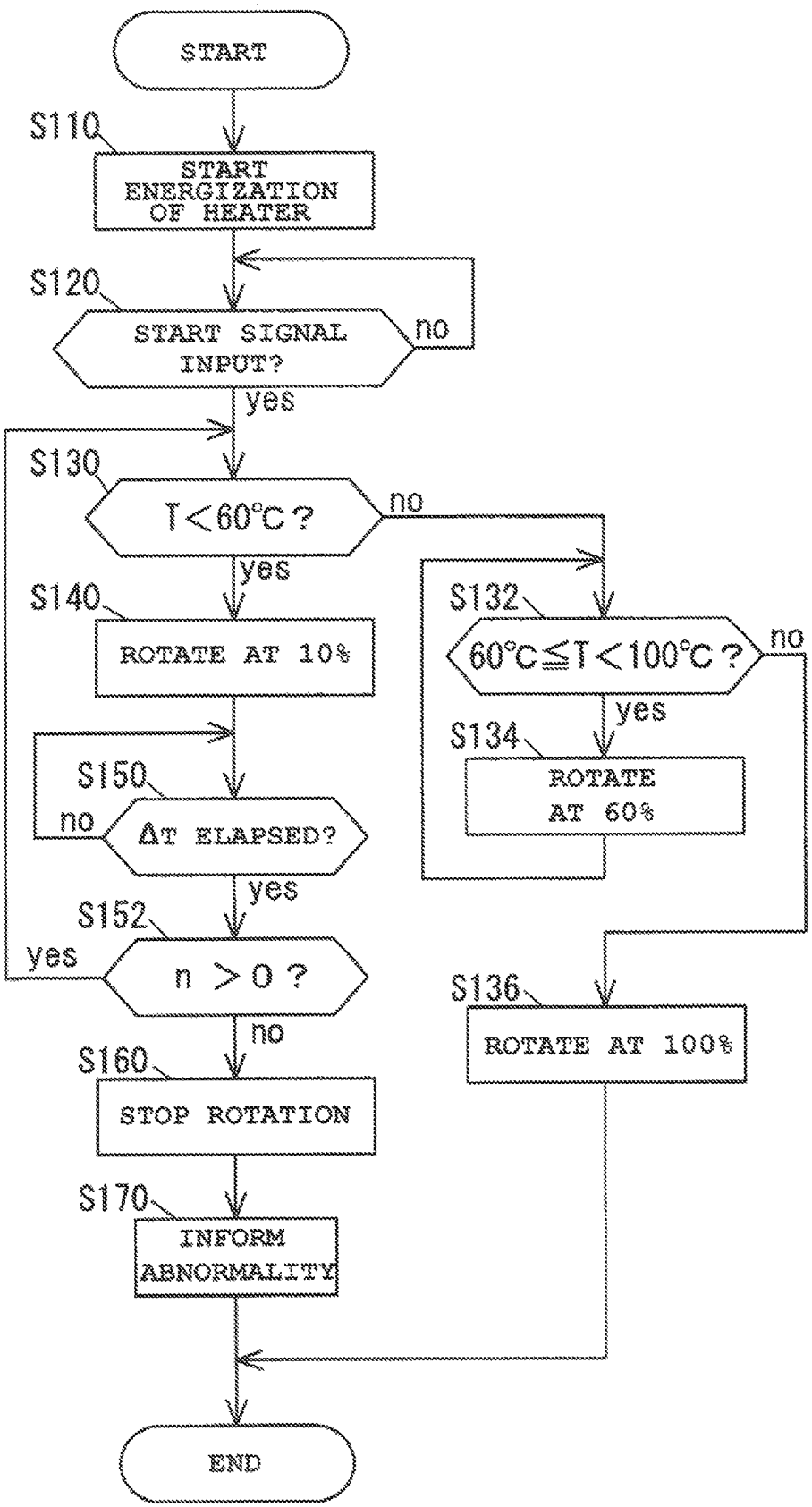
FIG. 8 is a flowchart of control operation in a second embodiment.

FIGS. 7 and 8 are a graph and a flowchart for describing a second embodiment of the present invention. In the second embodiment, multiple rotor rotation speeds at which a cylindrical portion 42 and a stator 32 do not contact each other are set according to a stator temperature. FIG. 7 is a graph of an example of a relationship between the stator temperature T and the rotor rotation speed, and the vertical axis N indicates the rotation speed in units of % with respect to a rated rotation speed. In the second embodiment, when the stator temperature is lower than 60° C., rotation is made at a rotation speed which is 10% of the rated rotation speed. When the stator temperature is equal to or higher than 60° C. and lower than 100° C., rotation is made at a rotation speed which is 50% of the rated rotation speed. When the stator temperature is equal to or higher than 100° C., rotation is made at the rated rotation speed (i.e., a 100 percent rotation speed).

FIG. 8 is a flowchart of control operation in the second embodiment. At a step S110, a temperature control section 24 starts energization of a heater 38. At a step S120, it is determined whether or not a start signal has been input to a main control section 20. When it is determined as confirming input of the start signal (YES), the processing proceeds to a step S130.

At the step S130, based on a detection signal of a temperature sensor 39, it is determined whether or not the stator temperature T is lower than 60° C. When it is determined as T<60° C., the processing proceeds to a step S140. In other cases, the processing proceeds to a step S132. At the step S140, the rotor rotation speed is set to 10% of the rated rotation speed. At a step S150, it is determined whether or not a predetermined time Δt has been elapsed after start of acceleration. When the predetermined time Δt has been elapsed, the processing proceeds to a step S152. At the step S152, it is determined whether or not the rotor rotation speed n satisfies n>0, i.e., whether or not a pump rotor 4 begins rotating. When it is determined as n>0 at the step S152, the processing returns to the step S130. When it is determined as n=0, the processing proceeds to a step S160. At the step S160, rotor rotation is stopped. At a subsequent step S170, the abnormality informing processing of informing that rotation does not begin is performed. Then, a series of processing ends.

On the other hand, when the processing proceeds from the step S130 to the step S132, it is, at the step S132, determined whether or not the stator temperature T satisfies 60° C.≤T<100° C. When it is determined as 60° C.≤T<100° C. at the step S132, the processing proceeds to a step S134 to change the rotor rotation speed to 60% of the rated rotation speed. Then, the processing returns to the step S132. On the other hand, it is not determined as 60° C.≤T<100° C. at the step S132, the processing proceeds to a step S136 to set the rotor rotation speed to the rated rotation speed (100%).

As shown in FIG. 7, the rotor rotation speed is changed in a stepwise manner in association with a change in the stator temperature. In this manner, a time until the state of satisfying Stator Temperature T=T0 and the state of reaching the rated rotation speed are brought can be shortened, and can be substantially equal to a temperature elevation time.

In the embodiments described above, the turbo-molecular pump 100 includes the pump unit 1 including the heater 38 configured to elevate the temperature of the stator 32 to the target temperature T0 and the temperature sensor 39 configured to detect the temperature of the stator 32; and the control unit 2 as a control section. When a rotation start command is input after start of energization of the heater 38, the control unit 2 stops rotary driving of the pump rotor 4 at the rated rotation speed until the temperature of the stator 32 reaches the predetermined temperature Tth set lower than the target temperature T0. When the temperature of the stator 32 exceeds the predetermined temperature Tth, the control unit 2 allows rotary driving at the rated rotation speed.

With such a configuration, the operator is freed from the burden of start operation upon start-up of the pump, i.e., the burden of performing the start operation after the temperature of the stator 32 has reached the target temperature T0. Further, since the predetermined temperature Tth is set lower than the target temperature T0, a time required for start-up of the pump, i.e., a time until the target temperature T0 and the rated rotation speed after heater energization, can be shortened as compared to (Temperature Elevation Time Δt1+Acceleration Time Δt2). Note that the predetermined temperature Tth is set to such a temperature that the cylindrical portion 42 of the pump rotor 4 and the stator 32 do not contact each other when the rotor rotation speed reaches the rated rotation speed, for example.

In rotor drive control until the predetermined temperature Tth, the pump rotor 4 may rotate at the rotation speed lower than the rated rotation speed as in FIG. 5B, or the pump rotor 4 may be stopped as in the case of the curved line Lr of FIG. 5A.

In the case of starting rotary driving at the low rotation speed as in FIG. 5B, when the main control section 20 of the control unit 2 determines that the pump rotor 4 is stopped after start of rotation, the abnormality may be informed by the configuration in which the abnormality signal is output from the main control section 20 or the configuration in which the abnormality is displayed on the display section 26. As a result, it can be detected that the pump rotor 4 does not rotate due to, e.g., adhesion of the cylindrical portion 42 to the stator 32 due to generation of the deposition substance.

Moreover, as shown in FIG. 7, a temperature range of equal to or lower than the predetermined temperature Tth (100° C. in the case of FIG. 7) in use of the pump is divided into multiple temperature ranges, and a higher predetermined rotation speed may be set for a higher temperature range. In the example shown in FIG. 7, the rotor rotation speed is 10% in a temperature range of lower than 60° C., and is 50% in a higher temperature range of equal to or higher than 60° C. and lower than 100° C. With such a setting, the time required for start-up of the pump can be shortened to the substantially same time as the temperature elevation time Δt1.

Note that the above-described embodiments may be used alone or in combination. This is because the advantageous effects of the embodiments can be provided separately or synergistically. As long as the features of the present invention are not prejudiced, the present invention is not limited to the above-described embodiments. For example, in the above-described embodiments, the heater 38 is provided at the outer periphery of the base 3. However, as in the pump described in Patent Literature 1, it may be configured such that the heater is provided at the stator 32 to directly heat the stator 32.

Moreover, in the above-described embodiments, the operation for acceleration to the rated rotation speed automatically begins when the stator temperature exceeds the predetermined temperature Tth after operation of the start switch. However, in the case where operation of the start switch 25b and the operation for acceleration to the rated rotation speed are simultaneously performed, the temperature elevation completion signal and the estimated temperature elevation completion time are provided so that the operator can easily find out the timing of operating the start switch.

What is claimed is:

1. A turbo-molecular pump comprising:
   a cylindrical rotor to be rotatably driven by a motor;
   a cylindrical stator provided corresponding to the cylindrical rotor;
   a heater configured to elevate a temperature of the stator to a target temperature;
   a temperature sensor configured to detect the temperature of the stator;
   a controller; and
   a rotation start command input to the controller after the heater has been energized, wherein:
   the controller is configured to, upon the rotation start command being input after the energization of the heater, determine whether or not the temperature of the stator exceeds a predetermined temperature set lower than the target temperature,
   the controller is configured to, in the case where it is determined that the temperature of the stator does not exceed the predetermined temperature, stop rotary driving of the cylindrical rotor at a rated rotation speed, and
   the controller is configured to, in the case where it is determined that the temperature of the stator exceeds the predetermined temperature, begin the rotary driving of the cylindrical rotor at the rated rotation speed.

2. The turbo-molecular pump according to claim 1, wherein
   the controller is configured to, in the case where it is determined that the temperature of the stator does not exceed the predetermined temperature, perform a first control of stopping the cylindrical rotor or a second control of rotatably driving the cylindrical rotor at a predetermined rotation speed lower than the rated rotation speed.

3. The turbo-molecular pump according to claim 2, wherein
   a temperature range of equal to or lower than the predetermined temperature in use of the pump is divided into multiple temperature ranges ranging from lower to higher temperature ranges, and the predetermined rotation speed at which the controller is configured to rotatably drive the cylindrical rotor, until the predetermined temperature, is different based on which of the multiple temperature ranges the temperature of the stator falls within, with a higher predetermined rotation speed being set for a higher temperature range among the multiple temperature ranges compared to a lower predetermined rotation speed for a lower temperature range among the multiple temperature ranges.

4. The turbo-molecular pump according to claim 1, wherein:
the controller is configured to provide temperature elevation completion information via the user interface when the temperature of the stator reaches the target temperature.

5. The turbo-molecular pump according to claim 1, wherein:
the controller is configured to estimate, based on the temperature of the stator detected by the temperature sensor, a temperature elevation time until the stator reaches the target temperature to provide the estimated temperature elevation time.

6. A method for controlling turbo-molecular pump, the turbo-molecular pump including a controller, a cylindrical rotor to be rotatably driven by a motor, and a cylindrical stator provided corresponding to the cylindrical rotor, the method including the steps of;
elevating a temperature of the stator to a target temperature;
detecting the temperature of the stator;
inputting a rotation start command to the controller after elevating the temperature of the stator, and using the controller to determine whether or not the temperature of the stator exceeds a predetermined temperature set lower than the target temperature,
in the case where it is determined by the controller that the temperature of the stator does not exceed the predetermined temperature, the controller stopping rotary driving of the cylindrical rotor at a rated rotation speed,
in the case where it is determined by the controller that the temperature of the stator exceed the predetermined temperature, the controller beginning the rotary driving at the rated rotation speed.

7. The method according to claim 6, wherein
performing, until the predetermined temperature, control of stopping the rotor or a second control of rotatably driving the rotor at a predetermined rotation speed lower than the rated rotation speed.

8. The method according to claim 7, comprising the steps of:
using the controller, determining whether or not the rotor is stopped while the second control is being performed, and
using the controller, informing an abnormality when the rotor is determined to be stopped.

* * * * *